(12) United States Patent
Blättler

(10) Patent No.: US 9,738,303 B2
(45) Date of Patent: Aug. 22, 2017

(54) ASSEMBLY HAVING AT LEAST ONE SPRING BODY AND AT LEAST ONE SEPARATELY FORMED LOCKING PART

(71) Applicants: THYSSENKRUPP PRESTA AG, Eschen (LI); THYSSENKRUPP AG, Essen (DE)

(72) Inventor: Simon Blättler, Altstätten (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 14/916,951

(22) PCT Filed: Aug. 13, 2014

(86) PCT No.: PCT/EP2014/002216
§ 371 (c)(1),
(2) Date: Mar. 4, 2016

(87) PCT Pub. No.: WO2015/036077
PCT Pub. Date: Mar. 19, 2015

(65) Prior Publication Data
US 2016/0214637 A1    Jul. 28, 2016

(30) Foreign Application Priority Data
Sep. 10, 2013    (DE) .................. 10 2013 109 931

(51) Int. Cl.
*B62D 1/184*    (2006.01)
*B62D 1/19*    (2006.01)
*B62D 1/185*    (2006.01)

(52) U.S. Cl.
CPC ............. *B62D 1/184* (2013.01); *B62D 1/185* (2013.01); *B62D 1/195* (2013.01)

(58) Field of Classification Search
CPC ......... B62D 1/184; B62D 1/185; B62D 1/195
See application file for complete search history.

(56) References Cited

U.S. PATENT DOCUMENTS

| 6,322,103 B1 * | 11/2001 | Li ...................... B62D 1/195 280/777 |
| 6,591,709 B1 * | 7/2003 | Kim .................. B62D 1/184 280/775 |

(Continued)

FOREIGN PATENT DOCUMENTS

| DE | 102008007094 A1 | 9/2009 |
| EP | 1975036 A2 | 10/2008 |

(Continued)

OTHER PUBLICATIONS

English Translation of Int'l Search Report for PCT/EP2014/002216 dated Nov. 6, 2014 (mailed Nov. 14, 2014).

*Primary Examiner* — Faye M Fleming
(74) *Attorney, Agent, or Firm* — thyssenkrupp North America, Inc.

(57) ABSTRACT

An example arrangement comprising at least one spring body and at least one separately formed locking part for engagement in an engagement element of a steering column of a vehicle may involve pivotably mounting the spring body and the locking part about a common pivoting axis. The spring body may have at least one spring tongue for spring loading the locking part and at least one fastening part for fastening the spring body on a bolt of the steering column. The spring body may have at least one latching device for latching and unlatching the spring body into at least one and from at least one mating latching device of the locking part.

12 Claims, 3 Drawing Sheets

(56) References Cited

U.S. PATENT DOCUMENTS

| | | | | |
|---|---|---|---|---|
| 8,413,541 B2* | 4/2013 | Davies | ............... | B62D 1/184 |
| | | | | 280/777 |
| 8,794,671 B1* | 8/2014 | Figlioli | ............ | B62D 1/195 |
| | | | | 280/775 |
| 8,827,311 B2* | 9/2014 | Schnitzer | .......... | B62D 1/184 |
| | | | | 188/371 |
| 2004/0089091 A1* | 5/2004 | Bechtel | ............ | B62D 1/184 |
| | | | | 74/493 |
| 2006/0049621 A1* | 3/2006 | Lee | ................ | B62D 1/195 |
| | | | | 280/777 |
| 2006/0090586 A1 | 5/2006 | Lee | | |
| 2013/0298717 A1 | 11/2013 | Burns | | |
| 2015/0090068 A1* | 4/2015 | Anspaugh | .......... | B62D 1/184 |
| | | | | 74/493 |

FOREIGN PATENT DOCUMENTS

| | | | |
|---|---|---|---|
| WO | 2010094050 A1 | 8/2010 | |
| WO | 2011147503 A1 | 12/2011 | |

\* cited by examiner

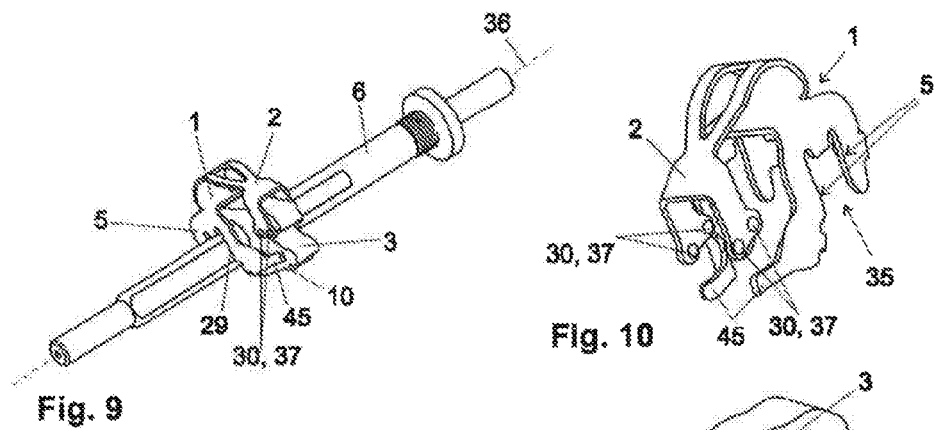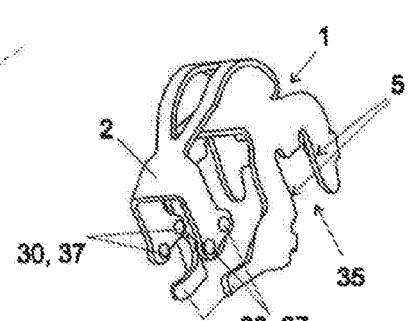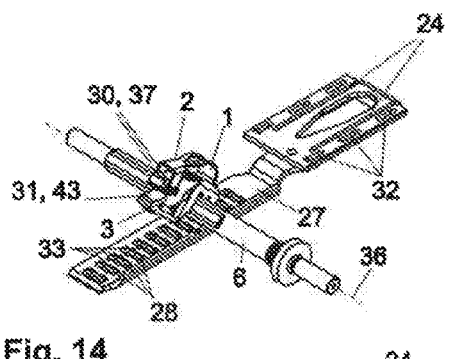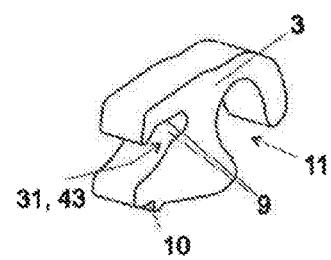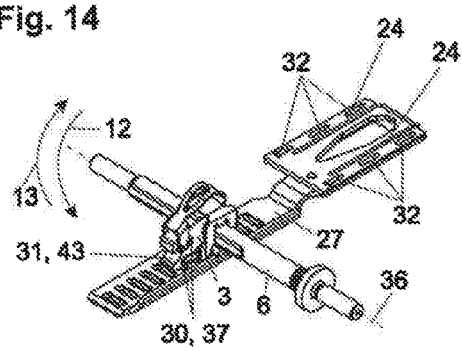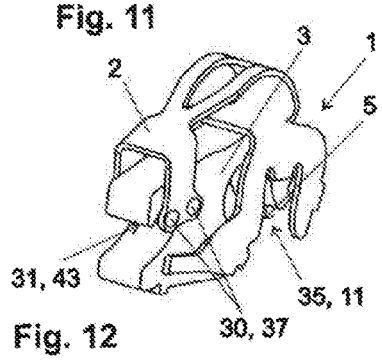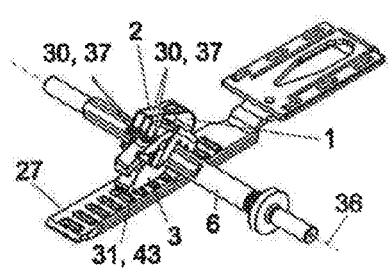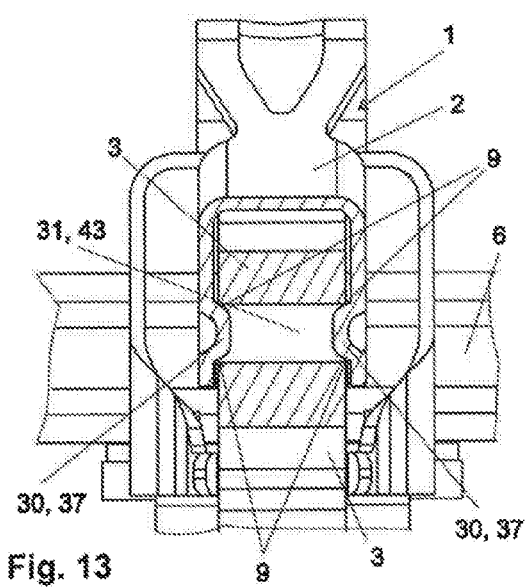

ASSEMBLY HAVING AT LEAST ONE SPRING BODY AND AT LEAST ONE SEPARATELY FORMED LOCKING PART

CROSS REFERENCE TO RELATED APPLICATIONS

This application is a U.S. National Stage Entry of International Patent Application Serial Number PCT/EP2014/002216, filed Aug. 13, 2014, which claims priority to European Patent Application No. DE102013109931.9 filed Sep. 10, 2013, the entire contents of both of which are incorporated herein by reference.

FIELD

The present disclosure relates to steering columns and, more particularly, to mechanisms with spring bodies and/or locking parts for steering columns.

BACKGROUND

Steering columns and components thereof are known from WO 2011/147503 A1, for example. There, the locking part is lifted out of a corresponding engagement element in the form of a tab portion by means of driver arms by pivoting the bolt and the spring body in order to be able to adjust a steering column which has such an arrangement.

One problem of the arrangement of the type in question as shown in WO 2011/147503 A1 is that, when it is abused by impact or pressure on the steering wheel or the steering column, the locking part may jam in the engagement element. If an attempt is then made to pivot the spring body together with the locking part in such a way that the locking part no longer engages in the corresponding engagement element, the driver arms of the spring body may be bent or break off in the prior art.

Therefore, one example object of the present disclosure is to improve arrangements of the type in question in such a way that this problem is eliminated.

BRIEF DESCRIPTION OF THE FIGURES

FIG. 7 is a perspective view of an example arrangement in an engagement position wherein there is engagement between an example locking part with its locking tooth and an example engagement element with its apertures and webs arranged there-between.

FIG. 9 is a perspective view of an example arrangement in which an example latching device is implemented in the form of example latching projections on an example spring tongue.

FIG. 10 is a perspective view of an example spring body.

FIG. 11 is a perspective view of an example locking part.

FIG. 12 is a perspective view of an example arrangement comprising an example spring body and an example locking part isolated from other components of a steering column.

FIG. 13 is a sectional view of example latching devices latched in an example mating latching device.

FIG. 14 is a perspective view of an example arrangement wherein an example latching device and an example mating latching device are latched into one another and wherein an example locking part is in a released position.

FIG. 15 is a perspective view of an example arrangement in an engagement position wherein there is engagement between an example locking part with its locking tooth and an example engagement element with its apertures and webs arranged there-between.

FIG. 16 is a perspective view of an example arrangement in an unlatched state after an example locking part has been jammed by an axial load on a steering spindle and a bolt has been pivoted together with an example spring body in an opening direction.

DETAILED DESCRIPTION

Figure 1:
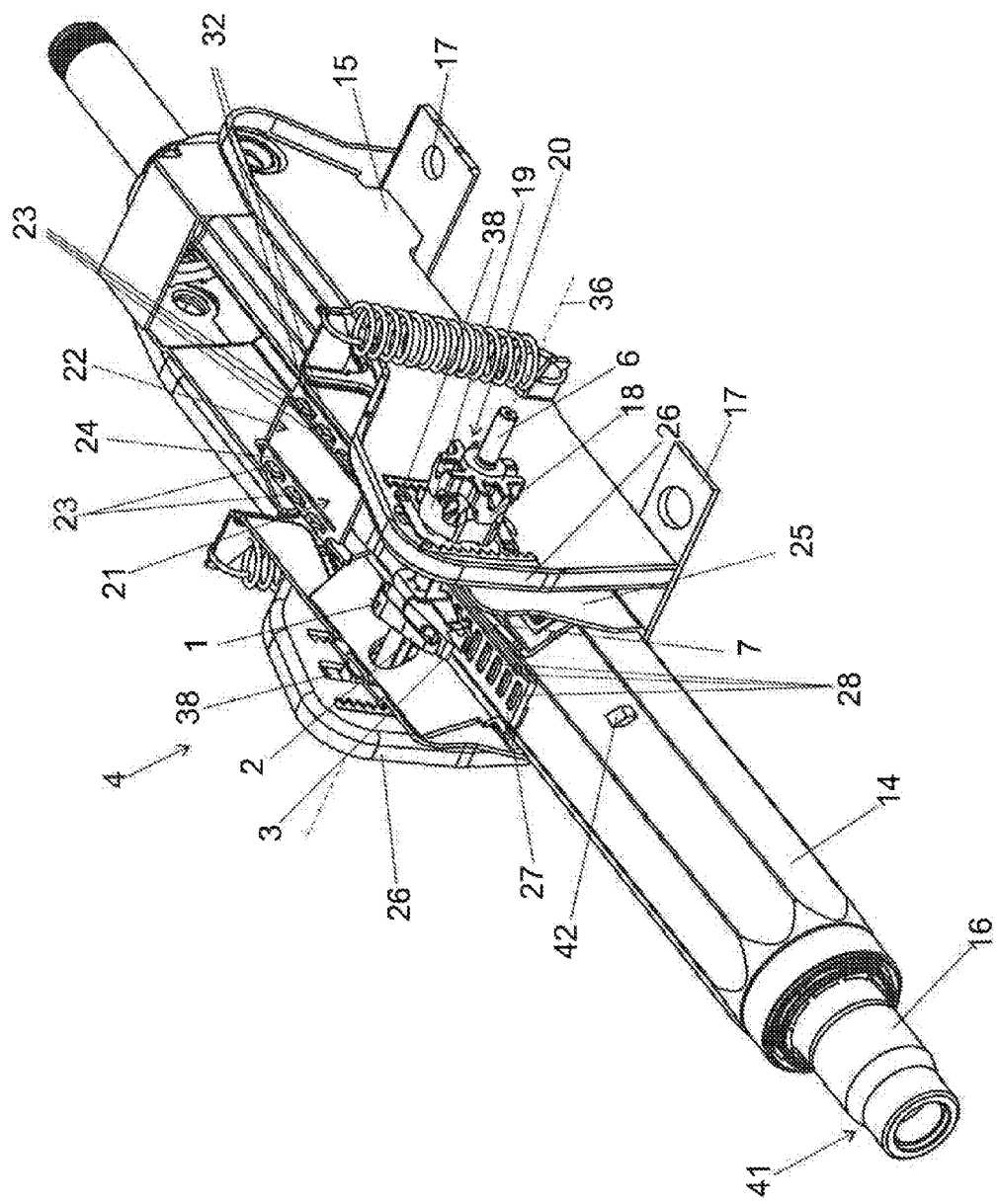
FIG. 1 is a perspective view of an example steering column for a vehicle having an example arrangement.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

The present disclosure concerns steering columns for motor vehicles as well as mechanisms having at least one spring body and at least one separately formed locking part for engagement in an engagement element of a steering column of a vehicle. Those having ordinary skill in the art will appreciate that the term 'arrangement' and 'mechanism' are used interchangeably in the present disclosure. Moreover, the spring body and the locking part may or can be mounted pivotably about a common pivoting axis, and the spring body may have at least one spring tongue for spring loading the locking part and at least one fastening part for fastening the spring body on a bolt of the steering column.

To overcome the shortcomings of the prior art, the spring body may at least in some examples have at least one latching device for latching and unlatching the spring body into at least one and from at least one mating latching device of the locking part.

Interaction of the latching device provided according to the invention with the mating latching device makes it possible for the spring body to unlatch from the locking part in the abovementioned case of abuse, in which the locking part is jammed in the engagement element, without impairing or destroying the spring body or the locking part. Once the locking part is then free again and no longer jammed in the engagement element, the latching device of the spring body can latch into the mating latching device of the locking part again, ensuring that the arrangement according to the invention is fully functional again. The spring body and/or the locking part or the latching device and mating latching device thereof are advantageously deformed in an exclusively elastic way during latching and unlatching. There are therefore advantageously no plastic deformations.

The locking effect of the locking part is preferably effected by the engagement of the locking part in the engagement element and can be intended for various purposes in the steering column. By switching over or actuation, it is possible here to activate and deactivate the locking effect, depending on requirements. Here, the locking effect is brought about by pivoting the locking part into an engagement position, in which it engages in the engagement element. In particular, the locking part can lock the position of an adjustable steering column and/or allow connection of an energy absorption means to part of the steering column, when required. To improve operation, provision is advantageously made for the movement of the locking part to be subject to spring preloading by means of the spring tongue of the spring body, at least in the direction of one end position, preferably in the direction of the engagement position. The locking part is designed as a separate component, thereby allowing a design which is particularly suitable for locking and allowing the choice of material to be matched to requirements, while the spring body can be designed to be particularly suitable for providing the spring effect and also the driving effect. In the sense according to the invention, a driving effect or driving should be taken to mean a transfer of the movement between two bodies, in particular the spring body and the locking part.

By virtue of the design according to the invention, it is possible for the spring body to perform a dual function. Thus, the spring tongue can preload or load the locking part in a direction toward the engagement position, e.g. in order to lock the locking part on the engagement element. The preloading of the locking part in a direction toward the engagement position thereof can be transferred from the spring body to the locking part by direct contact of the spring tongue with the locking part. However, transfer of this preloading is also possible by means of the engagement between the latching device and the mating latching device. The driving function is important particularly for the movement of the locking part in the opposite direction, i.e. out of the engagement position into a released position. This transfer of the movement of the spring body to the locking part in a direction toward the released position can also be achieved by means of the engagement between the latching device and the mating latching device. Since the spring body performs both functions, a very simple construction overall is obtained. Moreover, tolerance differences in the various individual parts are well compensated through the use of the spring body.

In this regard, particularly preferred embodiments envisage that the spring body is of integral design. The spring body can be embodied as a formed sheet-metal part, for example. This is particularly preferably an integral formed sheet-metal part. The spring tongue can be a leaf spring, for example.

Preferred embodiments of the invention can also envisage that the spring body has a receiving cavity, partially enclosed by walls of the spring body, for receiving at least part of the locking part. The locking part can then be arranged at least partially in the receiving cavity partially enclosed by walls of the spring body.

There are various solutions to the question as to where the latching device is arranged on the spring body. In a first category of embodiments, provision can be made for the spring body to have, in addition to the spring tongue, at least one driver arm for taking along the locking part during a pivoting movement of the spring body about the pivoting axis, and for the latching device to be formed on the driver arm. The driver arms are fundamentally known from the abovementioned prior art. In the invention, they are preferably of resilient design. They can be arranged opposite one another, thus allowing the locking part to be arranged between them. In contrast to the abovementioned prior art, however, the driver arm or arms engages/engage on the mating latching device of the locking part and hence on the locking part via a latching device which can be latched and unlatched. In this category of embodiment of the invention, provision is advantageously made for the preloading of the locking part in a direction toward the engagement position to be provided by means of the spring tongue of the spring body, while the driving function, i.e. the movement or pivoting of the locking part in a direction toward the released position, is accomplished by means of the driver arms and the engagement of the latching device in the mating latching device.

In a simplified embodiment, it is also possible to dispense with the driver arms, however. Thus, for example, provision can be made for the latching device to be formed on the spring tongue. Both the latching device and the mating latching device can have at least one latching projection. As a particularly preferred option, it is envisaged that the latching device or the mating latching device has at least two latching projections, which are arranged spaced apart and point toward one another. It is equally possible for the latching device or the mating latching device to have at least one engagement opening, which is delimited by a stop region or by at least two mutually opposite stop regions. Thus, both the latching device on the spring body and the mating latching device on the locking part can be embodied as a latching projection or latching projections. The corresponding mating part in the form of the latching device or mating latching device can then be embodied as an engagement opening, into which the latching projection or projections engages/engage in the latched position. Both the stop regions of the engagement opening and the corresponding surfaces of the latching projections can be of beveled or rounded design in order to simplify the latching and/or unlatching of the latching device and the mating latching device.

The latching device and the mating latching device can be designed and interact with one another in such a way that there is a certain play between them in the latched state. This means that, depending on the relative positions of the spring body and the locking part, it is first necessary, in some angular positions, to pivot the spring body further by a certain distance around the pivoting axis before the spring body preloads or loads the locking part in a direction toward the engagement position and/or drives the locking part in a direction toward the released position. In order to produce this play, provision can be made for the engagement opening to be elongated at least along a circular path around the pivoting axis. Since both the spring body and the locking part are each pivoted about the pivoting axis during the movement between the engagement position and the released position, this also applies to the latching device and the mating latching device, and therefore the engagement opening can be made elongated at least along a circular path around the pivoting axis if a corresponding play is desired. Of course, the engagement opening does not necessarily have to be in the form of a circular path to achieve this. For example, the engagement opening can also have a rectangular shape or the like in which there is space for a corresponding circular path. The preloading function and/or driving function described then occurs only when the latching projection or projections strikes/strike against a stop region delimiting the engagement opening, for example.

In general, provision is advantageously made, in the latched state of the latching device in the mating latching device, for the locking part to be positively coupled to the spring body when the spring body pivots in at least one pivoting direction about the pivoting axis. In the latched state, the abovementioned play between the latching device and the mating latching device can be implemented in this case, with the result that positive coupling between the locking part and the spring body occurs only after a certain angular position. In the unlatched state, the locking part does not necessarily have to be pivotable about the pivoting axis independently of the spring body over the full angular range of 360°. It may also be sufficient for this to be possible only over a limited angular range.

In preferred embodiments, an arrangement according to the invention additionally has a bolt. The spring body can be secured on this bolt by means of its fastening part for conjoint rotation in respect of pivoting about the pivoting axis. This means that any rotation of the bolt about the pivoting axis necessarily leads to corresponding pivoting of the spring body about the pivoting axis. The connection for conjoint rotation can be achieved by means of positive engagement, for example. It is advantageous if the pivoting axis extends in the bolt, preferably coaxially with the bolt.

In preferred embodiments, it is envisaged that the locking part is positively coupled to the spring body and the bolt exclusively through the interaction of the latching device and the mating latching device as regards a pivoting movement about the pivoting axis. With a view to this, provision is advantageously made for the locking part to be arranged so as to be freely pivotable on the bolt, at least over a certain range. This means that the connection between the locking part and the bolt is embodied in such a way that the locking part would be freely pivotable on the bolt without the spring body. This can be implemented in this way over a pivoting angle of 360° but also over a smaller pivoting angle range. Thus, it may be sufficient if the locking part is arranged so as to be freely pivotable on the bolt, at least over a certain range. The bolt can be embodied as a solid bar, but can also have a cavity. It can therefore also be implemented in the form of a tube or sleeve, for example.

The bolt can be a clamping bolt (known per se) of a fixing device or energy absorption device of a steering column. The bolt can be passed through a bolt-receiving opening in the locking part. For the sake of simple mounting of the spring body and the locking part on the bolt, preferred embodiments envisage that the fastening part of the spring body and/or the bolt-receiving opening have an outwardly open insertion opening. By means of the respective insertion opening, the spring body and the locking part can be pushed onto the bolt, preferably being snapped on, if appropriate jointly, in a direction orthogonal to the longitudinal axis of the bolt.

The bolt-receiving opening in the locking part is advantageously configured in such a way that, as already explained above, the bolt can be rotated without stops in the bolt-receiving opening of the locking part, preferably over 360° and more. For this purpose, the bolt-receiving opening can have a circular cross section, for example, apart from the insertion opening if appropriate.

It is advantageous if the latching device and the mating latching device are arranged spaced apart from the pivoting axis in a radial direction.

Particularly preferred embodiments of the invention envisage that the spring tongue spring-loads the locking part in all operating positions. In such embodiments, permanent action of the spring tongue on the locking part is thus provided. If the locking part is in engagement with the engagement element, the spring tongue thus presses the locking part reliably onto or into the engagement element. If, on the other hand, the latching device and the mating latching device rest against one another in the released position of the locking part, the spring tongue presses the locking part into the engagement between the latching device and the mating latching device. In both cases, the locking part is preloaded by means of the spring tongue, thus preventing the occurrence of unwanted rattling of the locking part.

To damp vibrations and/or noise, provision can be made to design the spring body with a damping covering, either fully or in certain surface regions, or to arrange dampers on the spring body.

The invention also relates to a steering column for a vehicle, which has at least one first component and at least one second component, wherein the components can be moved relative to one another in at least one operating state of the steering column and wherein the components are secured to one another or can be secured to one another by means of a fixing device and/or an energy absorption device in another operating state of the steering column, wherein it is envisaged that the fixing device and/or the energy absorption device has/have at least one arrangement according to the invention. Thus, provision can be made, for example, for the arrangement according to the invention to be arranged on a first one of the components and for the locking part to engage in the engagement element in the engagement position, said engagement element being arranged on the other one of the components.

One of these components of the steering column can be, for example, a steering spindle bearing unit, in which the steering spindle on which the steering wheel is secured is rotatably mounted.

The other of the components of the steering column can be, for example, a "bracket unit", which has been fixed or is fixed on the vehicle itself. Steering columns that have two components that can be moved, preferably slid, relative to one another are known per se in numerous embodiments in the prior art as adjustable steering columns. By adjusting the two components, that is to say, for example, the steering spindle bearing unit and the bracket unit, relative to one another, the position of the steering wheel can be adapted to the driver. Here, a fixing device of the steering column has at least one position in which the two components can be moved relative to one another for adjustment. Furthermore, the fixing device has at least one second position, in which the components are fixed positively and/or frictionally in their position relative to one another. In the prior art, provision of what are referred to as energy absorption devices in steering columns is furthermore known. These serve as far as possible to prevent injury to the driver due to the driver striking the steering wheel in the event of a crash, when the vehicle strikes an obstacle. Energy absorption devices of the type in question which are known per se here serve to ensure that the two said components of the steering column can be displaced relative to one another under defined conditions in order to absorb, in a manner which is tolerable for the driver, the energy which arises when the driver strikes the steering wheel. Said fixing devices and energy absorption devices can be embodied in an integrated way as a single device or as separate devices. It is then possible to equip such fixing devices and/or energy absorption devices of a steering column with an arrangement according to the invention.

In its basic features, the steering column shown in FIG. 1 is known from WO 2011/147503 A1. In contrast to this prior art, however, an arrangement according to the invention comprising spring body 1 and locking part 3 is used here. In addition, the steering column 4 shown in FIG. 1 is equipped with the bolt 6. Before the details essential to the invention are explained, however, a brief description will first be given of the rest of the construction of the steering column 4, which is known per se. As a second component 15, the steering column 4 has a bracket unit, which is provided for the purpose of securing the steering column 4 to the vehicle. For this purpose, the second component 15 has the fastening lugs 17. The first component 14 of the steering column 4 shown is a steering spindle bearing unit, in which the steering spindle 16 is rotatably mounted. In this embodiment, as is known per se, the intermediate part 25 is arranged between the first component 14 and the second component 15. The second component 15, which is designed as a bracket unit, has two lateral cheeks 26, between which the steering spindle bearing unit in the form of the first component 14, together with the intermediate part 25, is fixed in its position when the fixing device 20 is in its closed position. In the open position of the fixing device 20, the position of the first component 14 in the form of the steering spindle bearing unit relative to the second component 15, i.e. the bracket unit, can be adjusted. As is known per se, the fixing device 20 has a bolt 6 designed as a clamping bolt. The cam disk 18 and the cam follower disk 19 are situated thereon. The cam follower disk 19 is secured non-rotatably on the lateral cheek 26. The cam disk 18 is fixed on the bolt 6 in such a way that it is necessarily rotated with the latter about the pivoting axis 36. By rotation of the bolt 6, the fixing device 20 can be moved into the open position and also into the closed position. This is known per se and does not need to be explained further. To rotate the bolt 6 about the longitudinal axis thereof or about the pivoting axis 36, a motor or the like can be provided. In simple embodiments, a manually actuable lever, which is not shown in FIG. 1 but is known per se, is provided for this purpose on the bolt 6. When the fixing device 20 is in the open position, the first component 14 can be moved relative to the second component 15, while the bolt 6 is moved at the same time in the slotted holes 38 in the lateral cheeks 26. In the embodiment shown, positive engagement is established between the teeth visible on the lateral cheek by means of the fixing device 20 in the closed position thereof in order to lock the height adjustment. The longitudinal adjustment is locked by means of frictional or nonpositive engagement between the lateral cheeks. However, the fixing device 20 can also equally well be of exclusively frictional or nonpositive or exclusively positive design, or can combine frictional and positive engagement. It is also possible for the steering column 4 to be adjustable in only one direction, i.e. vertically or longitudinally.

In order to be able to selectively dissipate the energy introduced into the steering column 4 by the driver striking a steering wheel or the steering spindle 16 in the event of a crash, the first embodiment under consideration also has an energy absorption device 21 in addition to the fixing device 20. In the embodiment shown, this provides a tearing/bending tab 22, which is fixed on the first component 14. As an alternative, a pure bending tab or a pure tearing tab can also be provided, as is shown by way of example in FIGS. 18 to 21 of WO 2011/147503 A1. This fixing can be achieved by means of a very wide variety of measures known in the prior art. In the embodiment shown, the tearing/bending tab 22 has openings 32, through which the hooks 23 fixed on the first component 14 are passed. The interaction between the hooks 23 and the openings 32 leads to the desired fixing of the tearing/bending tab 22 on the first component 14. In the embodiment shown, the tearing/bending tab 22 has a tab portion in which a series of apertures 28 is arranged. The locking part 3 can engage in said apertures 28 by means of its at least one locking tooth 10. The locking part 3 can be designed as a pawl, as a hook or the like. The locking part 3 is preferably mounted pivotably on the bolt 6, as also implemented in the embodiment shown.

In the embodiment shown, the tab portion with its apertures 28 serves as an engagement element 27, into which the locking part 3 can engage by means of its locking tooth 10. Here, the engagement element 27 and the tab portion are fixed on the first component 14 in the manner shown. By virtue of being mounted on the bolt 6, the locking part 3 is pivotable on the second component 15, i.e. on the bracket unit fixed to the vehicle, but is otherwise fixed. If the driver strikes the steering wheel (not shown here), which is to be mounted on the mounting stub 41 of the steering spindle 16, and hence strikes the steering spindle 16 in the event of a crash, said spindle is pushed into the bracket unit in the form of the second component 15 in the longitudinal direction of the steering spindle 16 together with the steering spindle bearing unit in the form of the first component 14. Given the appropriate energy input, the tearing/bending tab 22 bends and tears at the weak points 24 since the tearing/bending tab 22, as already explained, is secured on the first component 14, on the one hand, and also, via the locking part 3, on the second component 15, on the other hand. In this arrangement, a stop 42 can be provided, limiting the movement along the longitudinal axis and breaking when a predefined force is exceeded, thus allowing further displacement, during which energy absorption is accomplished by means of the tearing/bending tab 22.

As regards the embodiment of the tearing/bending tab 22, it should be noted that the tearing/bending tab 22 is converted into a pure bending tab in a simple manner, while otherwise retaining the same configuration, by an embodiment of the tab in which the tab is divided along the weak point 24. It is at least advantageous that there remains a connecting region between the tab portion and the holding region, in which the openings 32 for receiving the hooks 23 are situated.

The basic construction of the steering column 4 as explained thus far is known per se, e.g. from WO 2011/147503 A1 and can be varied in a very wide variety of embodiments. As regards the arrangement designed in accordance with the invention, comprising spring body 1, locking part 3 and, if appropriate, bolt 6 of the first embodiment, reference is now made to FIGS. 2 to 8 described below.

Figure 2:
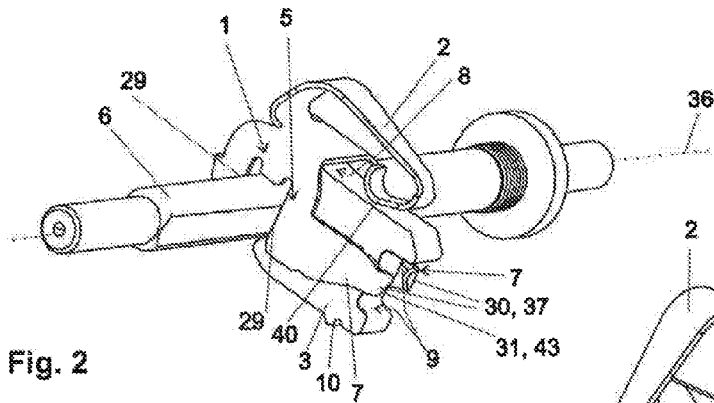
FIG. 2 is a perspective view of an example spring body and an example locking part isolated from other components of a steering column.

FIG. 2 shows the first embodiment of an arrangement according to the invention comprising spring body 1 and locking part 3, separately from the other components of a steering column 4, wherein these two parts are arranged on a bolt 6 of a fixing device 20. This is an example in which the latching device 37, which is implemented in the form of the latching projections 30 in this embodiment, is formed on the driver arms 7 of the spring body 1. Here, the latching device 37 and the driver arms 7 are formed on the spring body 1 in addition to the spring tongue 2. This spring body also has the fastening part 5, by means of which it is secured in such a way, by means of positive engagement 29, on the bolt 6 that rotation of the bolt 6 about the pivoting axis 36 necessarily leads to a corresponding rotary motion of the spring body 1, irrespective of whether this rotation about the pivoting axis 36 is then in the first pivoting direction 12 in the form of the closing direction or in the direction of the second pivoting direction 13, i.e. in the opening direction. The locking part 3 with its locking tooth 10 for engagement in the engagement element 27 or the apertures 28 thereof is likewise mounted on the bolt 6 so as to be pivotable about the pivoting axis 36. However, there is no direct connection for conjoint rotation between the bolt 6 and the locking part 3. In the embodiment shown, the pivoting movement of the locking part 3 is effected exclusively through the action of the spring body 1 on the locking part 3, both in the first pivoting direction 12 and in the second pivoting direction 13. The latched state of the latching device 37 and the mating latching device 43 is shown in FIGS. 2, 5, 6 and 7. In this latched state, the latching devices 37 of the driver arms 7 or of the spring body 1, said latching devices being designed as latching projections 30, engage in an engagement opening 31 elongated at least along a circular path around the pivoting axis 36. As seen in pivoting directions 12 and 13, this path is delimited at its mutually opposite ends by the stop regions 9. This engagement opening 31 does not necessarily have to be designed in the form of a circular path, as also shown by this embodiment. However, the engagement opening 31 at least forms the mating latching device 43 of the locking part 3 here in this embodiment.

Figure 3:
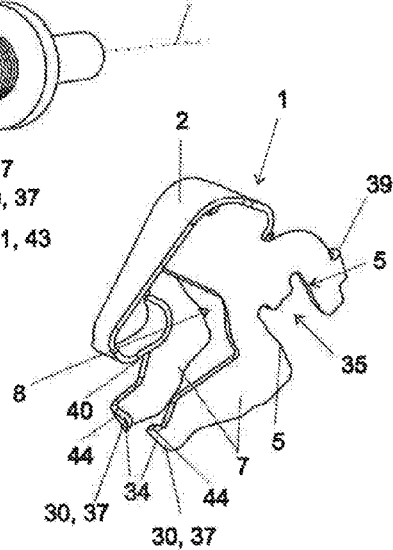
FIG. 3 is a perspective view of an example spring body from the example steering column of FIG. 1.

In the embodiment shown, the latching projections 30 of the latching device 37 have oblique surfaces 44 on the driver arms 7, said oblique surfaces making it easier to latch and unlatch the latching device 37 from the mating latching device 43. As already explained at the outset, provision is advantageously made here as well for both the spring body 1 and also the locking part 3 to be deformed exclusively in an elastic manner during latching and unlatching. FIG. 3 shows the spring body from FIG. 1 separately from all the other components. Here too, the insertion opening 35, into which the bolt 6 is introduced during the mounting of the spring body 1, is readily visible, said opening being designed in the manner of a blind hole, i.e. being open on one side. The side walls of the spring body 1, which delimit the insertion opening 35, form the fastening part 5, which here serves for the positive fastening of the spring body 1 on the bolt 6.

The centering jaws 39 serve to center the locking part 3 in the receiving cavity 8 of the spring body 1. They can be embodied as shown in FIG. 16 of WO 2011/147503 A1 and are an optional feature.

The rounded contact pressure portion 40 of that embodiment of the spring tongue 2 of the spring body 1 which has been chosen here is also readily visible in FIG. 3. By way of example, FIG. 3 also illustrates that the latching projections 30 or latching device 37 can be covered with a soft covering 34 in order to prevent rattling. This covering is also an optional feature. Other dampers are also possible. They can equally well be integrated into the mating latching device 43. Of course, this also applies especially to covering 34.

Figure 4:
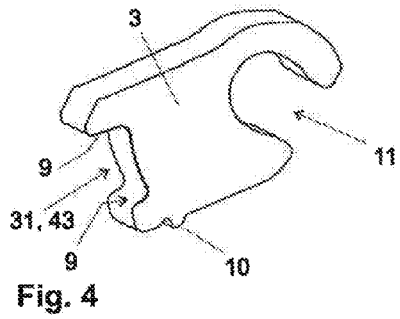
FIG. 4 is a perspective view of an example locking part.
Figure 5:
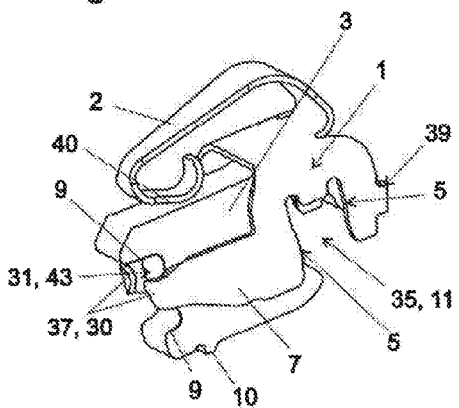
FIG. 5 is a perspective view of an example latching device shown in a latched state.

FIG. 4 shows the locking part 3 of this embodiment with its locking tooth 10 and the engagement opening 31, which here forms the mating latching device 43. The engagement element 31 is delimited by the stop regions 9. Here too, the design of the bolt-receiving opening 11, chosen by way of example, in the form of a blind hole, by means of which the locking part 3 can be placed on the bolt 6, is clearly visible. The unilaterally open shape of the bolt-receiving opening 11 in the locking part 3 and of the insertion opening 35 in the spring body 1 allows particularly simple mounting of the arrangement according to the invention on the bolt 6, during which the locking part 3 and the spring body 1 can be jointly pushed onto the bolt 6 from the side. By virtue of the embodiment of the bolt 6 and of the bolt-receiving opening 11, the locking part 3 per se can be pivoted freely about the pivoting axis 36 or on the bolt 6.

For the sake of completeness, it is pointed out that, as a departure from the embodiment shown, the latching device 37 of the spring body 1 can, of course, also be designed in the form of a corresponding engagement opening 31, e.g. if the mating latching device 43 of the locking part 3 carries corresponding latching projections 30. This also applies to the second embodiment described below. Of course, it is also possible for latching devices 37 and mating latching devices 43 formed in a completely different way to be implemented.

Figure 6:
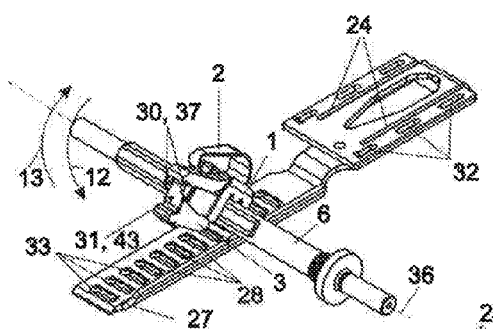
FIG. 6 is a perspective view of an example arrangement wherein an example latching device and an example mating latching device are latched into one another and wherein an example locking part is in a released position.
Figure 7:
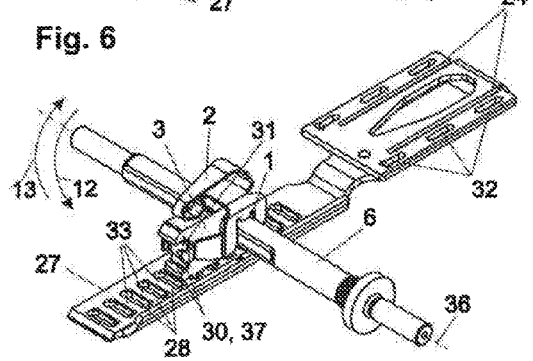
Figure 8:
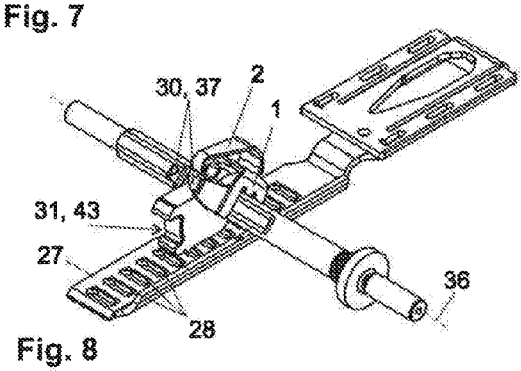
FIG. 8 is a perspective view of an example arrangement in an unlatched state after an example locking part has been jammed by an axial load on a steering spindle and a bolt has been pivoted together with an example spring body in an opening direction.

FIGS. 6 to 8 then show various functional positions of the first embodiment of an arrangement according to the invention. In FIGS. 6 and 7, the latching device 37 and the mating latching device 43 are each latched into one another. FIG. 8 shows the unlatched state after the locking part 3 has been jammed by an axial load on the steering spindle 16 and the bolt 6 has simultaneously been pivoted together with the spring body 1 in the second pivoting direction 13, i.e. in the opening direction. In FIG. 6, the locking part 3 is in the released position, in which it does not engage in the engagement element 27 or the apertures 28 therein. FIG. 7 shows the engagement position, in which there is engagement between the locking part 3 with its locking tooth 10 and the engagement element 27 with its apertures 28 and the webs 33 arranged therebetween. Of course, the type of engagement between the locking part 3 and the engagement element 27 can also be different and can be implemented using different elements.

In order to pivot the arrangement comprising the spring body 1 and the locking part 3 out of the released position shown in FIG. 6 into the engagement position shown in FIG. 7 in the first pivoting direction 12, the bolt 6 is rotated in the corresponding direction about the pivoting axis 36. During this process, the spring tongue 2 presses on the locking part 3 by means of its rounded contact pressure piece 40, with the result that said locking part must necessarily follow this pivoting movement in the first pivoting direction 12. As is also readily visible in FIG. 6, provision is advantageously made here for the preloading of the spring tongue 2 to be sufficient to press the locking part 3 by means of its upper stop region 9 against the latching projections 30 of the latching device 37 of the spring body 1. Unnecessary rattling in the released position is thereby avoided.

When the bolt 6 is pivoted by a corresponding amount, the locking tooth 10 and hence the locking part 3 then engages in one of the apertures 28 in the engagement element 27. If the locking tooth 10 accidentally strikes a web 33 while the locking part 3 is pivoting in the first pivoting direction 12, latching by virtue of the spring loading of the spring tongue 2 takes place at the latest at the start of an incipient relative movement between the engagement element 27 and the arrangement according to the invention or the bolt 6. This is known per se and does not require further explanation.

If the arrangement according to the invention is then to be pivoted about the pivoting axis 36 from the engagement position shown in FIG. 7 into the open position shown in FIG. 6, the bolt 6 is pivoted in the second pivoting direction 13 as explained at the outset, e.g. by means of a motor or a hand lever (not shown here). During this process, the spring body 1 is also pivoted about the pivoting axis 36 by virtue of the positive engagement 29 and the resulting connection for conjoint rotation between the spring body 1 and the bolt 6. As soon as the latching projections 30 of the latching device 37 come into contact with the corresponding stop region 9 of the mating latching device 43, the locking part 3 is taken along in the second pivoting direction 13, unless it is jammed in the engagement element 27, until the position shown in FIG. 6 is reached. This embodiment illustrates the fact that a certain play can be provided in the engagement of the latching device 37 in the mating latching device 43, making it necessary to pivot the spring body 1 by a certain amount before the driving function of the driver arms 7 with their latching projections 30 or the latching device 37 takes effect.

If the locking part 3 is then jammed in the engagement element 27 by means of its locking tooth 10, e.g. owing to a corresponding pressure in the axial direction on the steering spindle 16, the latching device 37 can unlatch here from the mating latching device 43 through elastic deformation of the latching projections 30 and, where applicable, also through elastic deformation of the corresponding regions of the locking part 3, thus allowing the spring body 1 to be rotated further together with the bolt 6, while the locking part 3 jammed in the engagement element 27 is not pivoted at the same time. According to the invention, this avoids a situation where there can be damage to the driver arms 7 or to the spring body 1 or to the locking part.

As soon as the pressure on the steering spindle 16 slackens, the locking part 3 can be released from the engagement element 27 without this leading to destruction or negative impairment of one of the components. Given appropriate alignment, the locking part 3 can then pivot out of the engagement element 27 under the action of gravity. However, it is also possible for a spring (not shown here) to be provided, said spring spring-loading the locking part 3 in the second pivoting direction 13. Irrespective of this, however, nondestructive re-engagement of the latching device 37 in the mating latching device 43 can take place if the spring body 1 is pivoted back in the first pivoting direction 13 together with the bolt 6 until there is corresponding engagement between the latching device 37 and the mating latching device 43. The arrangement according to the invention is then fully ready for operation again.

For the sake of completeness, it should be noted that lateral guidance of the locking part 3 in the receiving cavity 8 of the spring body 1 is also possible by appropriate shaping of the driver arms 7.

While the latching device 37 is thus formed on driver arms 7 of the spring body 1 in the first embodiment described above, the second embodiment in accordance with FIGS. 9 to 16 shows a variant according to the invention of an arrangement in which the latching device 37 is implemented in the form of latching projections 30 on the spring tongue 2. In this embodiment, it is possible to dispense with the driver arms 7. In order to provide a certain lateral guidance, it is possible, as shown here, for lateral guide arms 45 to be provided, but these serve exclusively for guidance here.

In order to avoid overlaps with the description of the first embodiment, only the differences will be explored here. Otherwise, that which has been explained in respect of the first embodiment also applies analogously to the second embodiment.

In addition to the arrangements with the latching device 37 directly on the spring tongue 2, another difference with respect to the first embodiment is that here no play in one of the pivoting directions 12 and 13 is provided during the engagement of the latching device 37 in the form of the rounded latching projections 30 in the mating latching device 43 in the form of the engagement opening 31 in the locking part 3. This can be seen particularly well in the enlarged FIG. 13, in which a section through the latching devices 37 latched in the mating latching device 43 is shown. The rounded surfaces of the latching projections 30 once again serve for easy elastic latching and unlatching of the latching devices 37 and the mating latching device 43.

In contrast to the first embodiment, the pivoting movement of the spring body 1 in the second embodiment is always transmitted from the latching device 37 to the locking part 3, both in the first pivoting direction 12 and in the second pivoting direction 13. By virtue of the play-free engagement of the latching device 37 and the mating latching device 43, there is no rattling of the locking part 3 in any position in this case too.

FIG. 14 shows the state as in FIG. 6. FIG. 15 shows the state as in FIG. 7, and FIG. 16 shows the state as in FIG. 8. Thus, in FIG. 16, the latching device 37 is unlatched from the mating latching device 43 of the locking part 3 by virtue of jamming of the locking part 3 in the engagement element 27 during simultaneous pivoting of the spring body 1 in the second pivoting direction 13. Relatching is likewise accomplished by pivoting in the first pivoting direction 12, with the result that the situation according to FIG. 15 is achieved again, given an appropriately large pivoting angle. FIG. 10 shows the spring body 1 of this embodiment separately from all the other components. The illustration in FIG. 11 corresponds to the illustration in FIG. 4. FIG. 12 shows the arrangement comprising the spring body 1 and the locking part 3 in the second embodiment separately from the other components.

For the sake of completeness, attention is furthermore drawn to the fact that arrangements according to the invention can, of course, also be used in steering columns 4 of other types, that is to say, in particular, with fixing devices 20 and/or energy absorption devices 21 of other types. For example, this also applies to the variants illustrated in FIGS. 12 and 17 as well as 22 to 24 in WO 2011/147503 A1 if the arrangements shown there comprising the spring body 1 and the locking part 3 are replaced by arrangements according to the invention. The bolt-receiving opening 11 and the insertion opening 35 can, of course, also be designed according to the alternatives shown in WO 2011/147503 A1. Moreover, there are, of course, also numerous further embodiments which differ but are nevertheless in accordance with the invention.

What is claimed is:

1. A mechanism for a steering column of a vehicle, the mechanism comprising:
    a spring body pivotably mounted or pivotably mountable about a common pivoting axis, wherein the spring body comprises a spring tongue, a latching device, and a fastening part configured to fasten the spring body to a bolt of the steering column; and
    a locking part for engagement in an engagement element of the steering column, the locking part being formed separately from the spring body, wherein the locking part is pivotably mounted or pivotably mountable about the common pivoting axis,
    wherein the spring tongue of the spring body is configured to spring load the locking part,
    wherein the latching device of the spring body is configured to latch the spring body into a mating latching device of the locking part and unlatch the spring body from the mating latching device of the locking part.

2. The mechanism of claim 1 wherein the spring body further comprises a driver arm for moving the locking part during a pivoting movement of the spring body about the common pivoting axis, wherein the latching device of the spring body is disposed on the driver arm.

3. The mechanism of claim 1 wherein the latching device of the spring body is disposed on the spring tongue.

4. The mechanism of claim 1 wherein either the latching device of the spring body or the mating latching device of the locking part comprises a latching projection.

5. The mechanism of claim 1 wherein either the latching device of the spring body or the mating latching device of the locking part comprises at least two latching projections that are spaced apart and point towards one another.

6. The mechanism of claim 1 wherein either the latching device of the spring body or the mating latching device of the locking part comprises an engagement opening that is delimited either by a stop region or by at least two mutually opposite stop regions.

7. The mechanism of claim 6 wherein the engagement opening is elongated at least along a circular path around the common pivoting axis.

8. The mechanism of claim 1 wherein the spring body is fastened to the bolt of the steering column by the fastening part of the spring body for conjoint rotation about the common pivoting axis, with the common pivoting axis extending in the bolt, wherein the locking part is pivotable on the bolt at least over a range.

9. The mechanism of claim 1 wherein with the latching device of the spring body and the mating latching device of the locking part in a latched state, the locking part is positively coupled to the spring body when the spring body pivots in at least one pivoting direction about the common pivoting axis.

10. The mechanism of claim 1 wherein with the latching device of the spring body and the mating latching device of the locking part in an unlatched state, the spring body is pivotable about the common pivoting axis independently of the locking part.

11. A steering column for a vehicle comprising:
a first component and a second component movable relative to one another in a first operating state of the steering column; and
at least one of a fixing device or an energy absorption device for securing the first and second components to one another in a second operating state of the steering column, wherein the at least one of the fixing device or the energy absorption device comprises:
a spring body pivotably mounted or pivotably mountable about a common pivoting axis, wherein the spring body comprises a spring tongue, a latching device, and a fastening part configured to fasten the spring body to a bolt of the steering column; and
a locking part for engagement in an engagement element of the steering column, the locking part being formed separately from the spring body, wherein the locking part is pivotably mounted or pivotably mountable about the common pivoting axis,
wherein the spring tongue of the spring body is configured to spring load the locking part,
wherein the latching device of the spring body is configured to latch the spring body into a mating latching device of the locking part and unlatch the spring body from the mating latching device of the locking part.

12. A mechanism for a steering column of a vehicle, the mechanism comprising:
a spring body including a fastening part that pivotably mounts the spring body about a common pivoting axis; and
a locking part for engagement in an engagement element of the steering column, the locking part being pivotably mounted about the common pivoting axis;
wherein in a latched state the spring body is latched to the locking part and in an unlatched state the spring body is unlatched from the locking part,
wherein a transition from the latched state to the unlatched state occurs when a force exerted on the steering column exceeds a predetermined force.

* * * * *